(12) United States Patent
Song

(10) Patent No.: US 6,393,297 B1
(45) Date of Patent: May 21, 2002

(54) METHOD OF REMOTELY CONTROLLING AN EXTERNAL APPLIANCE BY A MOBILE RADIO PHONE SYSTEM PROVIDING SHORT MESSAGE SERVICE

(75) Inventor: Ho Ji Song, Yongin (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/458,276

(22) Filed: Dec. 9, 1999

(30) Foreign Application Priority Data

Dec. 10, 1998 (KR) .............................................. 98-54134

(51) Int. Cl.⁷ .......................... H04Q 7/20; H04M 3/00; G08B 23/00
(52) U.S. Cl. .................... 455/466; 455/420; 340/870.02
(58) Field of Search ........................ 455/466, 88, 556, 455/557, 575, 419, 418, 420, 517, 66, 151.2, 414; 379/106.01, 56.3, 106.03, 106.02, 825.71, 825.72; 340/870.02

(56) References Cited

U.S. PATENT DOCUMENTS

| | | | | |
|---|---|---|---|---|
| 5,675,371 A | * | 10/1997 | Barringer | 348/6 |
| 5,748,104 A | * | 5/1998 | Argyroudis et al. | 340/870.11 |
| 5,802,467 A | * | 9/1998 | Salazar et al. | 455/420 |
| 5,892,758 A | * | 4/1999 | Argyroudis | 370/335 |
| 5,963,624 A | * | 10/1999 | Pope | 379/110.01 |
| 6,014,089 A | * | 1/2000 | Tracy et al. | 340/870.02 |
| 6,055,442 A | * | 4/2000 | Dietrich | 455/558 |
| 6,072,984 A | * | 6/2000 | Barringer | 455/6.1 |
| 6,230,004 B1 | * | 5/2001 | Hall et al. | 455/414 |
| 6,275,710 B1 | * | 8/2001 | Olnonen et al. | 455/466 |
| 6,301,484 B1 | * | 10/2001 | Rogers et al. | 455/466 |

* cited by examiner

Primary Examiner—Vivian Chang
Assistant Examiner—Charles N. Appiah
(74) Attorney, Agent, or Firm—Steve Cha; Klauber & Jackson

(57) ABSTRACT

A method for remotely controlling an external appliance via a mobile terminal in a mobile radio system supporting a short message service (SMS) which comprises the steps of periodically converting the status data of the external appliance into a short message in a predetermined form, transmitting the converted short message to the mobile terminal, setting the mobile phone in a short message transmission mode to transmit the converted short message to a designated message center, converting the received short message by the message center into the corresponding state data which is transmitted to an external appliance monitoring center, analyzing the state data of the short message by the monitoring center to produce a control command which is transmitted to the message center, converting the received control command by the message center into the corresponding short message which is transmitted to the mobile phone, transmitting the converted short message of the control command by the mobile terminal to the external appliance, and controlling the external appliance in accordance with the received short message of the control command.

6 Claims, 2 Drawing Sheets

Figure 1:
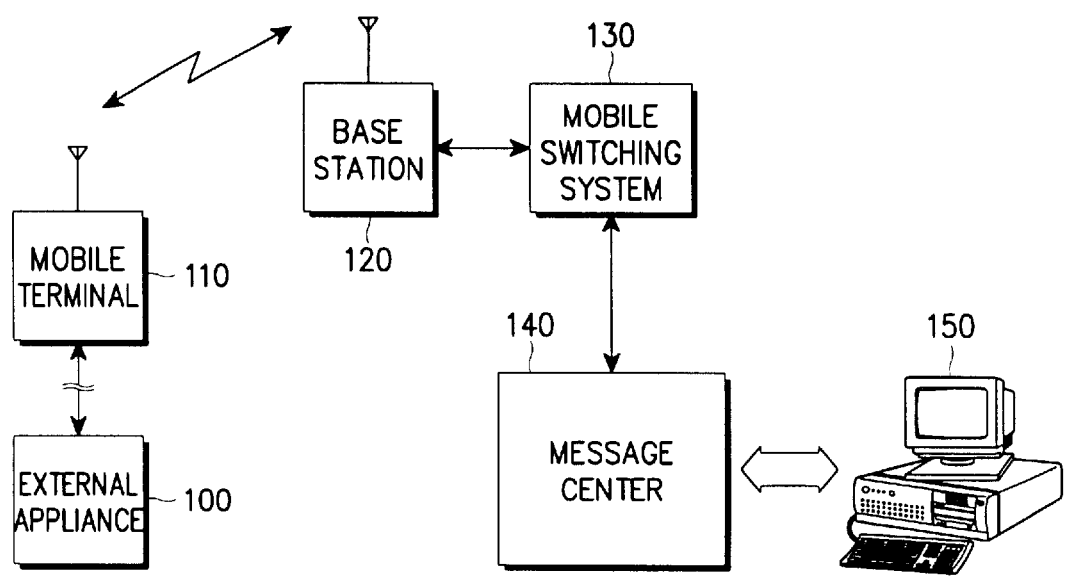

METHOD OF REMOTELY CONTROLLING AN EXTERNAL APPLIANCE BY A MOBILE RADIO PHONE SYSTEM PROVIDING SHORT MESSAGE SERVICE

CLAIM OF PRIORITY

This application makes reference to, incorporates the same herein, and claims all benefits accruing under 35 U.S.C. §119 arising from an application entitled, METHOD OF REMOTELY CONTROLLING AN EXTERNAL APPLIANCE BY A MOBILE RADIO PHONE SYSTEM PROVIDING SHORT MESSAGE SERVICE, filed earlier in the Korean Industrial Property Office on Dec. 10, 1998, and there duly assigned Serial No. 1998-54134.

BACKGROUND OF THE INVENTION

1. Field of the Invention

The present invention relates to a method of remotely controlling an appliance which is installed at a remote place not reachable by a conventional controller, and more particularly, for employing a short message service (SMS) provided in a mobile terminal to control the appliance in such remote area, without the need for any additional remote control equipment.

2. Description of the Related Art

Conventionally, when an appliance is installed in a remote area not directly reachable by a conventional remote controller, a wired or wireless control equipment is employed and attached to the appliance. Such additional remote control equipment to control the appliance in a hard to reach area results in high cost in installing, managing, and maintaining the remote control equipment.

SUMMARY OF THE INVENTION

It is one object of the present invention to provide a method for remotely controlling an external appliance by employing a mobile terminal supporting a short message service (SMS) without the need for any additional remote control equipment.

According to the present invention, a method for remotely controlling an external appliance via a mobile terminal in a mobile radio system providing short message service (SMS) comprises the steps of: periodically converting the status data of the external appliance into a short message in a predetermined form; transmitting the converted short message to the mobile terminal; setting the mobile phone in a short message transmission mode to transmit the converted short message to a designated message center; converting the received short message by the message center into corresponding state data which is transmitted to a monitoring center; analyzing the state data of the short message to produce a control command which is transmitted back to the message center; converting the received control command, by the message center, into a corresponding short message which is transmitted to the mobile phone; transmitting the converted short message of the control command by the mobile terminal to the external appliance; and, controlling the external appliance in accordance with the received short message of the control command.

A BRIEF DESCRIPTION OF THE DRAWINGS

Figure 2:
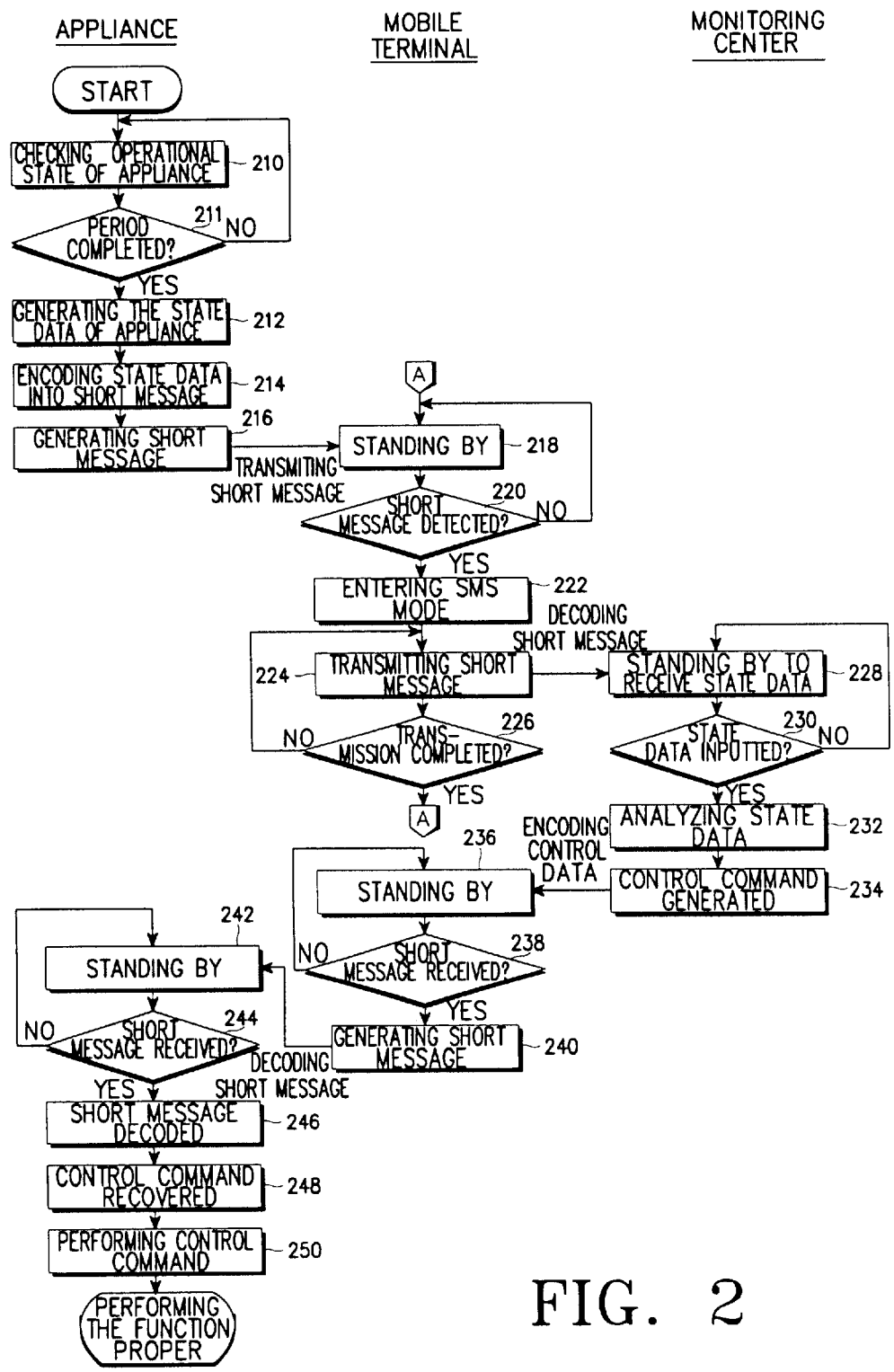

The above and other objects, features and advantages of the present invention will become more apparent from the following detailed description when taken in conjunction with the accompanying drawings:

FIG. 1 is a block diagram for illustrating a mobile radio system employing a short message service (SMS) to remotely control an external appliance according to the present invention; and, FIG. 2 is a flow chart for illustrating a method of remotely controlling an external appliance by employing a mobile radio system supporting a short message service (SMS), as shown in FIG. 1.

A DETAILED DESCRIPTION OF THE PREFERRED EMBODIMENT

A preferred embodiment of the present invention will be described hereinbelow with reference to the accompanying drawings. In the following descriptions, numerous specific details are set forth to provide a more thorough understanding of the present invention. It will be apparent, however, to one skilled in the art that the present invention may be practiced without these specific details. For the purpose of clarity, well-known constructions or functions are not described in detail so as not to obscure the present invention.

The present invention is applicable to all types of mobile terminals that are available in different mobile communication systems. Namely, the present invention may be applied to mobile terminals used in personal communications service (PCS) system and code division multiple access (CDMA) systems. Many cellular telephone networks support the transmission of short message service (SMS) messages between short message entities (SMEs), including mobile stations and short message terminals. SMS is generally used to transmit different types of messages including binary information, alphanumeric messages, multi-lingual messages, and specified other messages.

Referring to FIG. 1, a mobile terminal 110 is equipped with a data input/output port for communicating with an external appliance 100 via a data line. The external appliance 100 is provided with a separate control program for encoding/decoding short messages (SM) to/from the mobile terminal 110. The appliance 100 periodically checks its own operational state, and the status of the operation state is encoded into the corresponding short message in the SMS format to be transferred to the mobile terminal 110. The mobile terminal 110 exchanges voice and data signals with a base station 120 through a public switched telephone network (PSTN) and transmits the short message from the appliance 100 to the base station 120. The base station 120 is set by the service provider to transmit and receive data signals in the analog system, code division multiple access (CDMA) system, and/or time division multiple access (TDMA) system. The base station 120 detecting the mobile terminals in a prescribed area helps transmit voice and data signals of the mobile terminal 110 to transmit to the mobile switching system 130. The mobile switching system 130 coupled to the base station 120 for controlling the base station 120. One skilled in the art knows that the mobile terminal 110, base station 120, and mobile switching system 130 constitute a conventional mobile radio system for exchanging voice signals and short messages with one another.

The mobile switching system 130 interfaces the base station 120 to exchange voice and data signals with the mobile terminals. The mobile switching system 130 is connected to PSTN to provide links between a base station 120 and a message center 140. It transmits a detected short message from the base station 120 to the message center 140, which then decodes the transmitted short message in a predetermined format and transmits it to a monitoring center 150. The monitoring center 150 may be a computer or mobile terminal having a control program, and serves to manage the appliance 100 as dictated by a predetermined program or by the user/server of the system.

Both external appliance 100 and message center 140 are provided with internal encoding/decoding programs to encode/decode the short message. The encoding/decoding program may be prepared according to the specification defined by the IS-637 and IS-95A. The monitoring center 150 analyzes the short message decoded by the message center 140 indicating the status of the operation state of the appliance 100 and generates a modified control command data to the message center 140 in accordance with the predetermined program.

Referring to FIG. 2, the steps from 210 to 216 and from 242 to 250 represent the operation executed by the external appliance 100; the steps from 218 to 226 and from 236 to 240 are executed by the mobile terminal 110; and the steps from 228 to 234 represent the operation executed by the monitoring center 150. In step 210, the appliance 100 periodically checks its own operational state. If the period of the checking process is completed in step 21, it generates a state data in a given format in step 212. In step 214, the state data of the appliance is encoded into the corresponding SMS message format defined by the IS-637 and IS-95A standard. In step 216, the appliance 100 transmits the short message to the mobile terminal 110.

The mobile terminal 110 standing by in step 218 detects the short message transmitted from the appliance 100 via its data input/output port in step 220. By entering the SMS mode in step 222, the mobile terminal 110 transmits the received short message to the base station 120 by dialing a specified phone number in step 224. After completing the transmission of the short message in step 226, it returns to step 218. The short message is transmitted to the mobile switching system 130 via the base station 120, and then transmitted to the message center 140 for decoding the received short message into a given format defined by the IS-637 and IS-95A standard. This step of decoding is the reverse process of the encoding executed by the external appliance in order to recover the operation state of the appliance 100. Thereafter, the decoded data representing the operation state data is transmitted to a monitoring center 150 in step 228. Detecting the operation state data in step 230, a monitoring center 150 analyzes the data according to the internal program in step 232. In step 234, the monitoring center 150 generates a control command data responsive to the analysis of the operation state data and transmits it to the message center 140. The control command data is generated to manage the appliance 100 as set by the internal program of the monitoring center 150. This control command data is encoded by the message center 140 into the corresponding short message and the message center 140 provides the identification number of the mobile terminal 110 to the mobile switching system 130 to be transmitted to the mobile terminal 110 via the base station 120. The base station 120 transmits the received short message through PSTN to the mobile terminal 110. Subsequently, the mobile terminal 110 standing by in step 236 receives this short message transmitted from the base station 120. Detecting the short message in step 238, the mobile terminal 110 outputs the received short message to the appliance in step 240 via input/output port of the mobile terminal 110.

The appliance 100 standing by in step 242 detects the short message from the mobile terminal 110 in step 244, and decodes the short message in step 246 in order to recover the control command data encoded by the message center 140. Hence, the control command sent by the monitoring center 150 is recovered in step 248, and the appliance 100 functions in response to the control command sent by the monitoring center 150.

As an illustrative example of how the method in accordance with the present invention works, a heating system installed in a remote place is described; however, the present invention is not limited to the heating system and can be implemented to other appliances. First, the heating system encodes the operation state data of the present temperature into a short message and transmits to the mobile terminal. Then, the mobile terminal transmits the short message to the base station through PSTN and later transmitted to message center 140 through the mobile switching system 130. The message center decodes the received short message which represents the temperature state of the heating system to be transmitted to the monitoring center 150. The monitoring center 150 then analyzes and interprets the temperature state of the heating system and generates a control command to change the temperature of the heating system in accordance with the specified internal program. The control command is transmitted back to the message center for decoding into a short message to be transmitted through the mobile switching system 130 and to the base station 120. The base station 120 relays the short message through PSTN to the mobile terminal 110 and to the heating system, which in turn decodes the short message to recover the control command and the temperature of the heating system is adjusted responsive to the decoded control command. Although the encoding/decoding operations are achieved in the message center in the present embodiment, they also may be performed in the monitoring center if necessary. Thus, the invention provides a method of remotely controlling an appliance by employing the SMS of an existing mobile radio system.

While the present invention has been described in connection with specific embodiments accompanied by the attached drawings, it will be apparent to those skilled in this art that various changes and modifications may be made thereto without departing from the gist of the present invention.

What is claimed is:

1. A method for remotely controlling an external appliance using a mobile terminal in a mobile radio system which supports the transmission of short message service (SMS) messages, said method comprising the steps of:

periodically converting the operation state of said external appliance checked by said external appliance into a first short message and encoding said first short message in accordance with a predetermined format;

transmitting said encoded first short message to a mobile terminal;

transmitting said encoded first short message received by said mobile terminal to a message center;

decoding said first short message received from said mobile terminal in accordance with said predetermined format and transmitting said decoded first short message to a monitoring center;

analyzing said decoded short message by said monitoring center and thereafter generating a control command data to be transmitted to said message center;

encoding said control command data received from said monitoring center into a second short message in accordance with the predetermined format and transmitting said encoded second short message to said mobile terminal;

transmitting said second short message by said mobile terminal to said external appliance; and, decoding said second short message from said mobile terminal for controlling said external appliance responsive to said decoded second short message.

2. The method as defined in claim 1, wherein said monitoring center is a computer or a mobile station having a control program for managing said external appliance.

3. The method as defined in claim 1, wherein the predetermined format is defined by Interim Standard 637 (IS-637) and Interim Standard 95A (IS-95A).

4. A method for remotely controlling an external appliance using a mobile terminal in a network of mobile radio system which supports transmission of short message service (SMS) message, said method comprising the steps of:

periodically encoding the operation state data of said external appliance into a short message and transmitting the short message to a monitoring center via a mobile terminal and the network of said mobile radio system;

decoding said short message by said monitoring center for generating a control command;

encoding said control command by said monitoring center to be transmitted to said mobile terminal via the network of said mobile radio system;

transmitting said encoded short message of said control command by said mobile terminal to said external appliance; and, decoding said encoded short message of said control command by said external appliance to perform the function specified by said decoded control command.

5. The method as defined in claim 4, wherein said monitoring center is a computer or a mobile station having a control program for managing said external appliance.

6. The method as defined in claim 4, wherein said encoding and decoding are defined by Interim Standard 637 (IS-637) and Interim Standard 95A (IS-95A).

* * * * *